(12) United States Patent
Rabiean

(10) Patent No.: US 12,256,716 B2
(45) Date of Patent: Mar. 25, 2025

(54) INTEGRATED MULTI-FUNCTION VIRTUAL SLIDER REMOTE CONTROL OF ANIMAL COLLAR

(71) Applicant: Moris Rabiean, Los Angeles, CA (US)

(72) Inventor: Moris Rabiean, Los Angeles, CA (US)

(73) Assignee: Product Prodigy, Inc., Los Angeles, CA (US)

( * ) Notice: Subject to any disclaimer, the term of this patent is extended or adjusted under 35 U.S.C. 154(b) by 51 days.

(21) Appl. No.: 18/228,847

(22) Filed: Aug. 1, 2023

(65) Prior Publication Data

US 2023/0371474 A1 Nov. 23, 2023

Related U.S. Application Data

(63) Continuation-in-part of application No. 17/810,453, filed on Jul. 1, 2022, now abandoned.

(Continued)

(51) Int. Cl.
| | |
|---|---|
| *A01K 27/00* | (2006.01) |
| *G06F 3/04847* | (2022.01) |
| *G06F 3/0488* | (2022.01) |

(52) U.S. Cl.
CPC ........ *A01K 27/009* (2013.01); *G06F 3/04847* (2013.01); *G06F 3/0488* (2013.01)

(58) Field of Classification Search
CPC .. A01K 15/022; A01K 15/023; A01K 27/001; A01K 27/009; G06F 3/04847; G06F 3/0488; G06F 3/04883
See application file for complete search history.

(56) References Cited

U.S. PATENT DOCUMENTS

| | | | | |
|---|---|---|---|---|
| 2007/0191913 A1* | 8/2007 | Kim | ...................... | A01K 15/021 607/60 |
| 2012/0014684 A1* | 1/2012 | D'Souza | ................ | H04N 23/62 396/263 |

(Continued)

*Primary Examiner* — Omer S Khan

(57) ABSTRACT

Various embodiments of systems, methods, devices, and computer programs are disclosed for providing an integrated multi-function virtual slider remote control of an animal collar. One embodiment comprises a computer program embodied in a non-transitory computer readable medium and executable by a processor for providing a multi-function remote control for an electronic collar device for an animal. The computer program comprises logic configured to: define a slider axis on a remote control touch input panel comprising a slider activation region, a first function output control region, and a second function output control region; in response to detecting a tap and hold gesture in the slider activation region of the remote control touch input panel, initiating a virtual slider multi-function control operation configured to control an electronic collar device for an animal; enabling the virtual slider multi-function control operation while the tap and hold gesture maintains continuous contact with the remote control touch input panel; in response to detecting a slide gesture along the slider axis from the slider activation region to the first function output control region, generating a first function output control signal configured to initiate a first function at the electronic collar device; and in response to detecting the slide gesture extending along the slider axis from the first function output control region to the second function output control region, generating a second function output control signal configured to initiate a second function at the electronic collar device.

14 Claims, 17 Drawing Sheets

Related U.S. Application Data

(60) Provisional application No. 63/222,216, filed on Jul. 15, 2021.

(56) References Cited

U.S. PATENT DOCUMENTS

| | | | | |
|---|---|---|---|---|
| 2016/0286760 A1* | 10/2016 | Manguette | ............ | A01K 15/021 |
| 2018/0184618 A1* | 7/2018 | Gotts | .................... | A01K 27/009 |
| 2018/0275786 A1* | 9/2018 | Miyamoto | .............. | G06F 3/016 |

* cited by examiner

| SLIDER AXIS VALUE | OUTPUT SIGNAL |
|---|---|
| [1 – 50] | INITIATE OPERATION |
| [51 – 75] | FUNCTION_1_INTENSITY_1 |
| [76 – 100] | FUNCTION_1_INTENSITY_2 |
| [101 – 125] | FUNCTION_1_INTENSITY_3 |
| [126 – 150] | FUNCTION_1_INTENSITY_4 |
| [151 – 175] | FUNCTION_1_INTENSITY_5 |
| [176 – 200] | FUNCTION_2_INTENSITY_1 |
| [201 – 225] | FUNCTION_2_INTENSITY_2 |
| [226 – 250] | FUNCTION_2_INTENSITY_3 |
| [251 – 275] | FUNCTION_2_INTENSITY_4 |
| [276 – 300] | FUNCTION_2_INTENSITY_5 |

FIG. 12

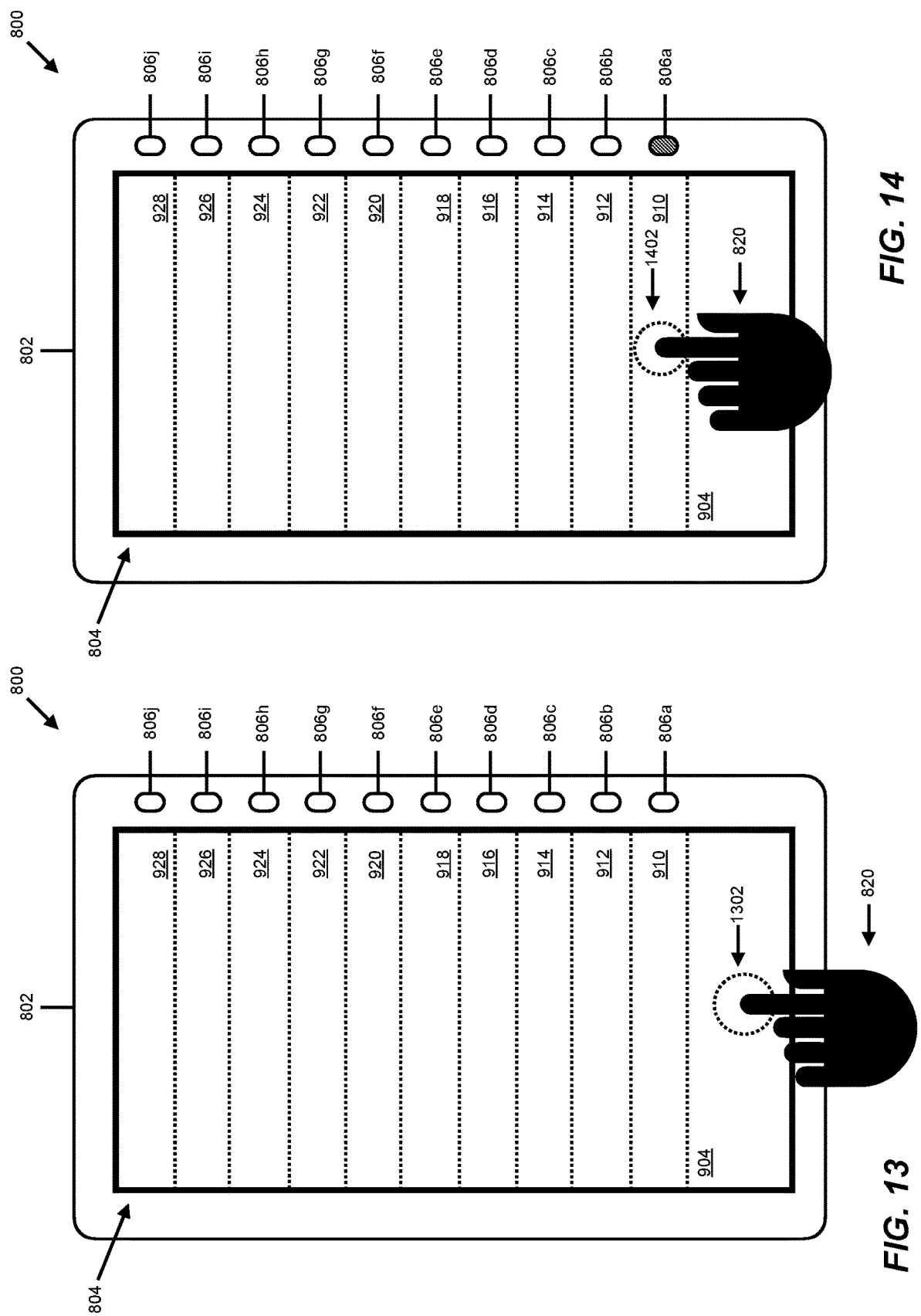

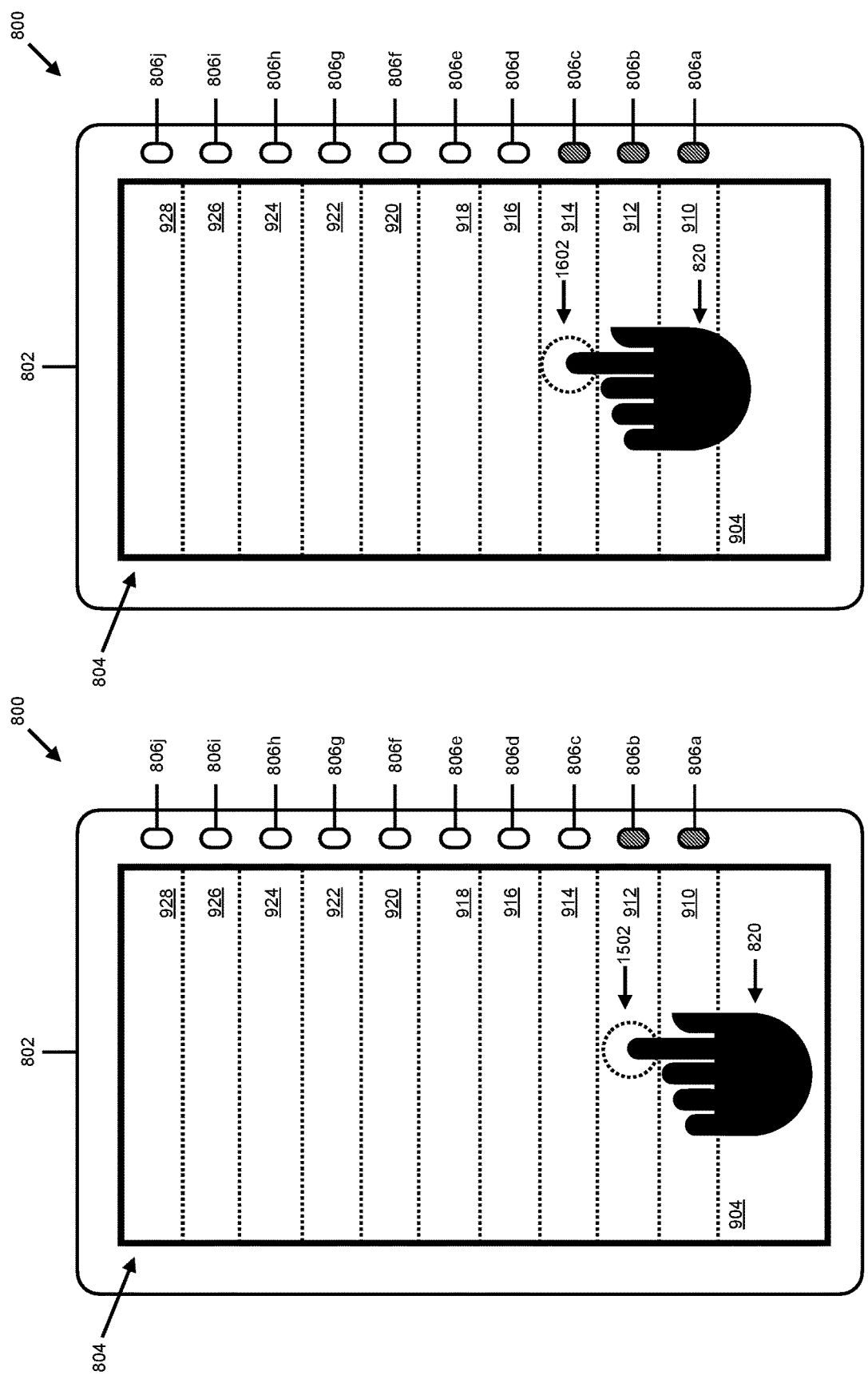

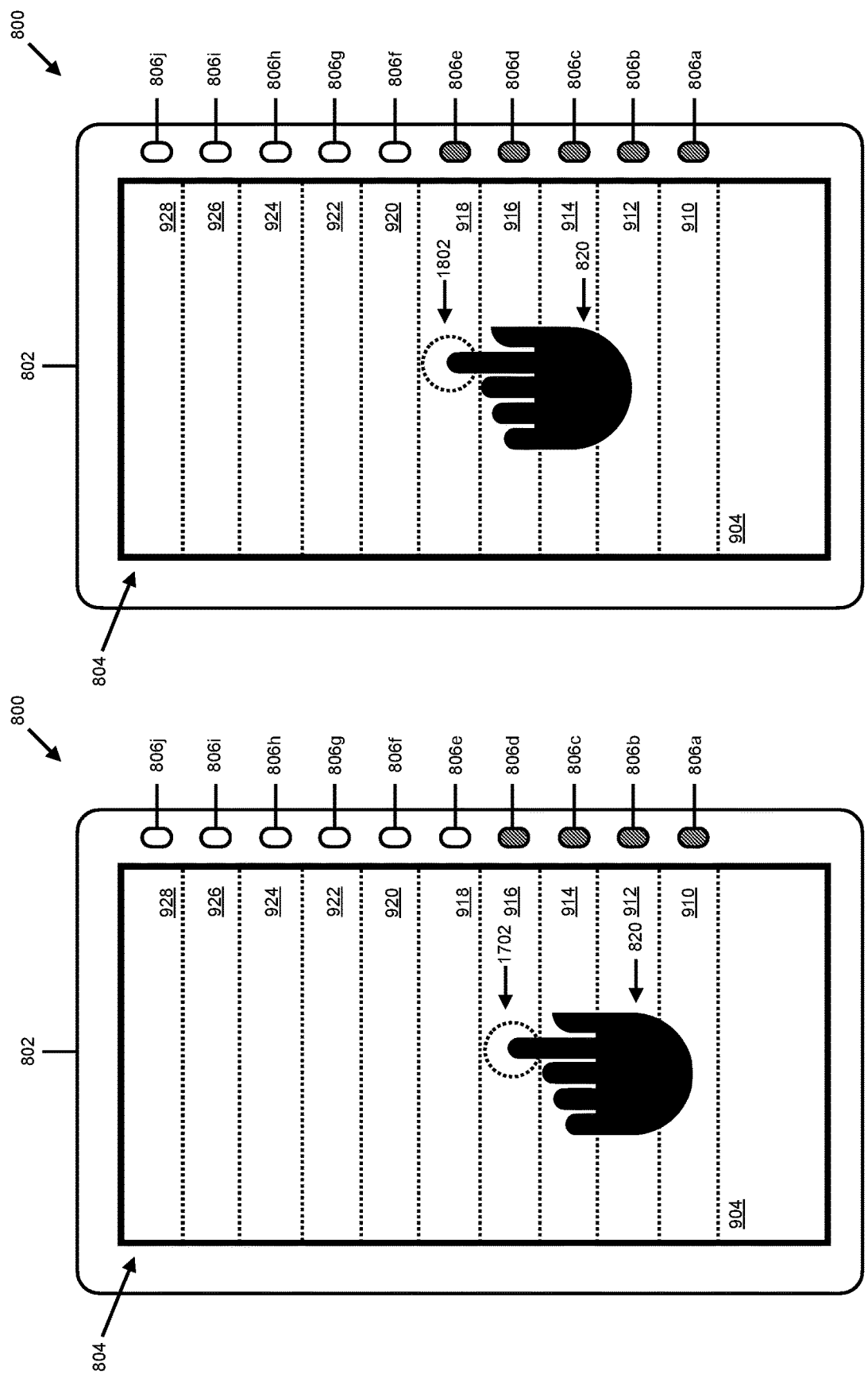

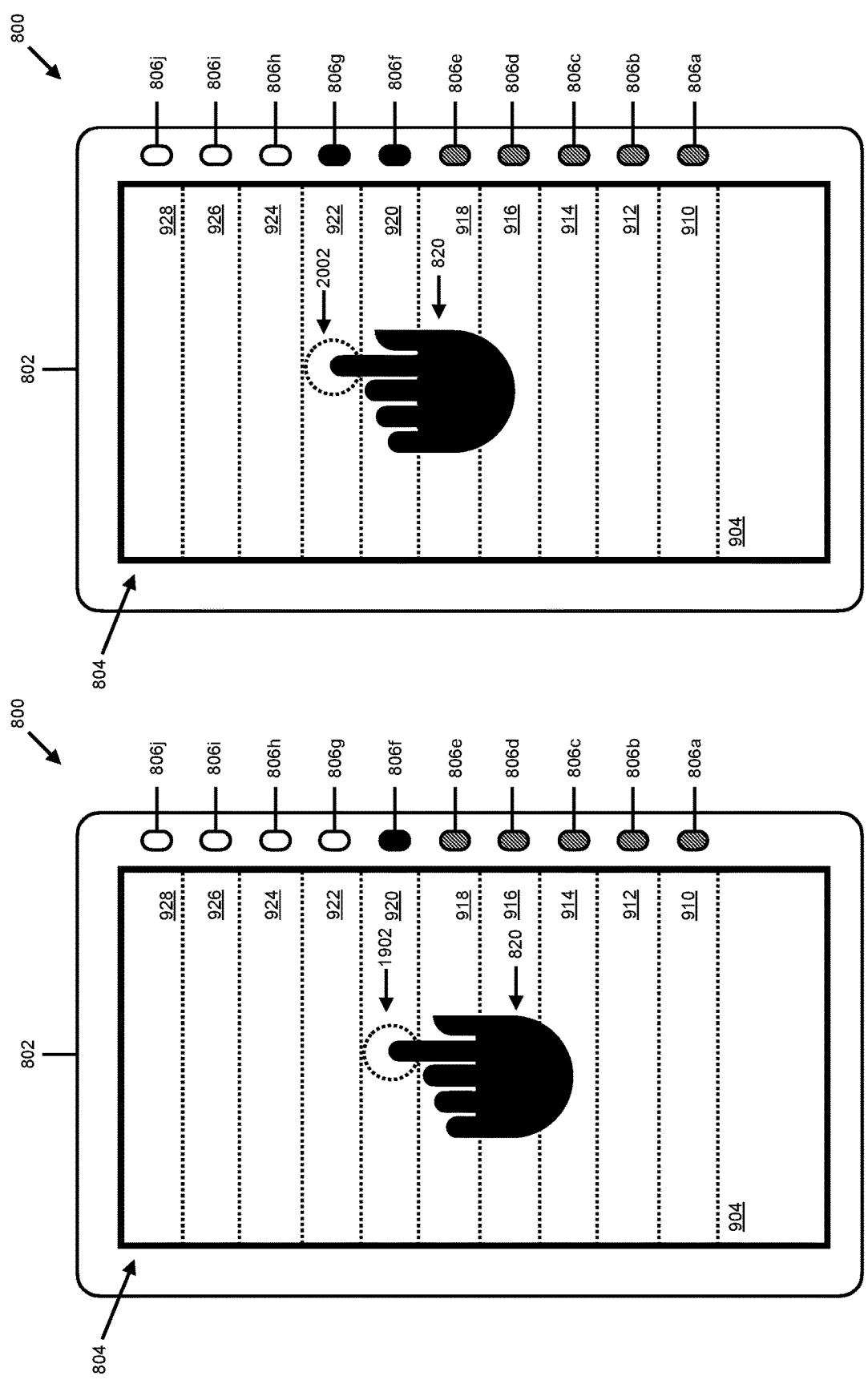

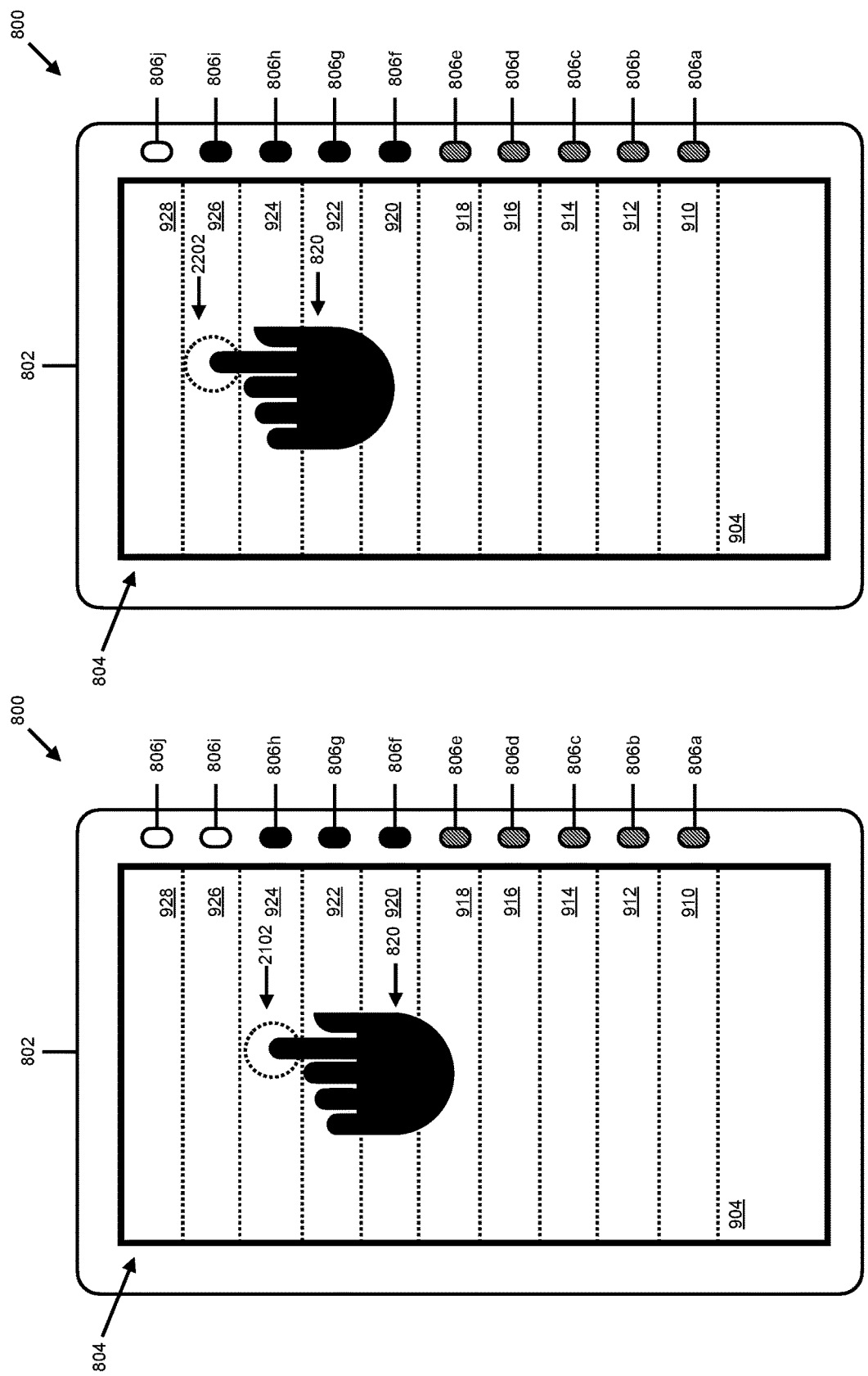

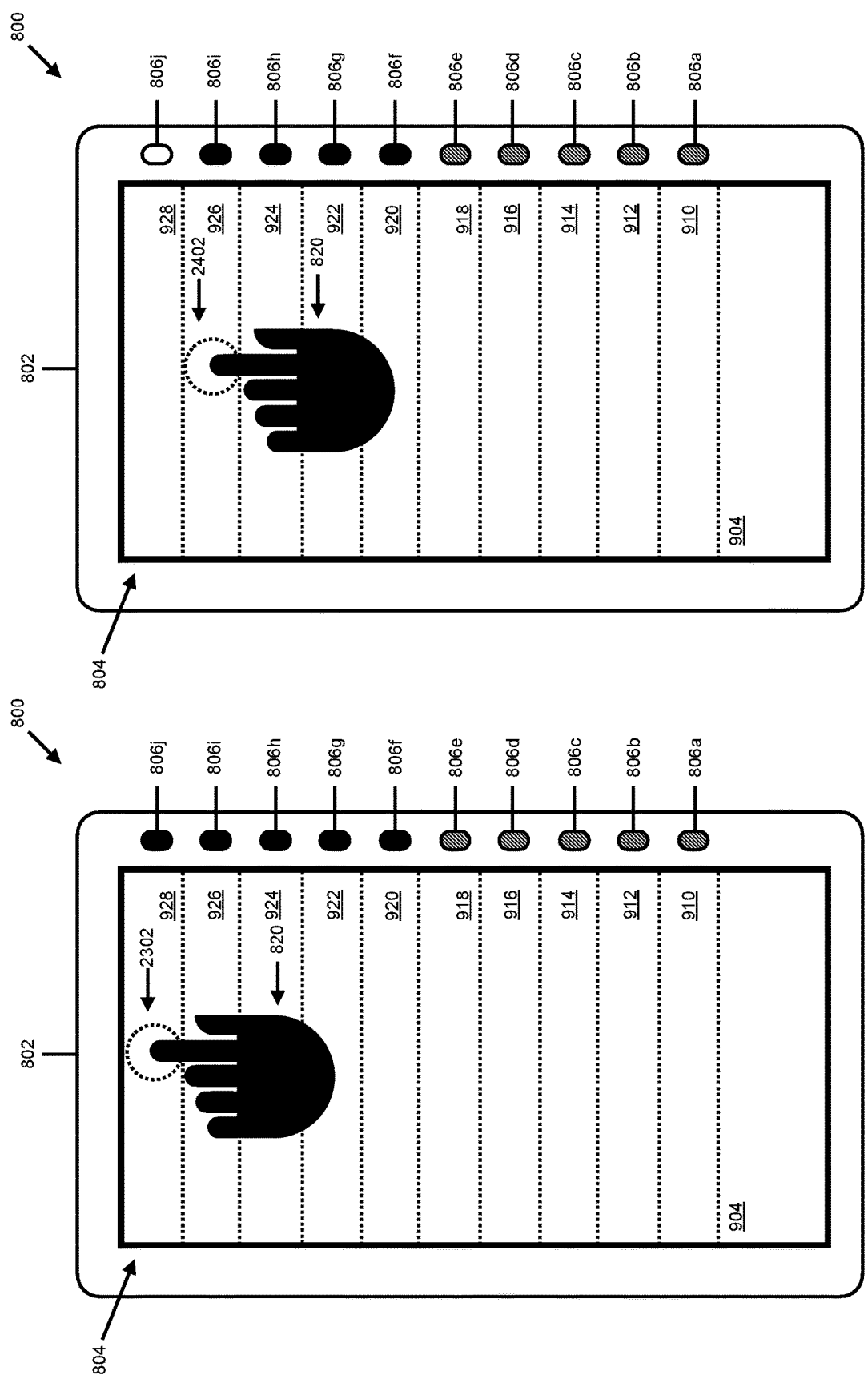

INTEGRATED MULTI-FUNCTION VIRTUAL SLIDER REMOTE CONTROL OF ANIMAL COLLAR

CROSS-REFERENCE TO RELATED APPLICATIONS

This application is a continuation-in-part of and claims the benefit of the priority of U.S. patent application Ser. No. 17/810,453 entitled "Shock Collar with Slider Remote and Wireless Charging Pad" and filed Jul. 1, 2022, which claims the benefit of the priority of U.S. Provisional Patent Application Ser. No. 63/222,216 filed on Jul. 15, 2021, each of which is hereby incorporated by reference in its entirety.

DESCRIPTION OF THE RELATED ART

A remote device to control the behavior of animals is in demand. In the field of animal training, owners or trainers have used various devices to correct animals' behavior.

Animal training systems are available that include a collar-type device and a remote controller that can wirelessly communicate with the collar-type device. A user can take control to deliver stimulation, such as electrical stimulation, to the collar-type device through the remote controller to correct behaviors of a dog, such as barking, going beyond a preset boundary, or attacking humans.

Dog shock collars and remote devices are used to train dogs, primarily to stop them from barking, scratching, running away, attacking other dogs, jumping on people, and so on. When a dog misbehaves, users can use different levels of vibration until the dog stops the unwanted behavior. If vibration does not work, the user can apply various levels of shock until the dog stops the behavior. However, the control devices currently available do not allow convenient changing among the signals sent to the dog so as to adapt to the changing behaviors of the dog or to avoid unwanted signals that could harm the dog. Thus, there is a need to develop a device that solves this problem.

The present invention is intended to address problems associated with and/or otherwise improve on conventional systems and devices through an innovative behavior control device that is designed to provide a convenient and effective means of controlling animal behaviors while incorporating other problem-solving features.

SUMMARY OF THE DISCLOSURE

Various embodiments of systems, methods, devices, and computer programs are disclosed for providing an integrated multi-function virtual slider remote control of an animal collar. One embodiment comprises a computer program embodied in a non-transitory computer readable medium and executable by a processor for providing a multi-function remote control for an electronic collar device for an animal. The computer program comprises logic configured to: define a slider axis on a remote control touch input panel comprising a slider activation region, a first function output control region, and a second function output control region; in response to detecting a tap and hold gesture in the slider activation region of the remote control touch input panel, initiating a virtual slider multi-function control operation configured to control an electronic collar device for an animal; enabling the virtual slider multi-function control operation while the tap and hold gesture maintains continuous contact with the remote control touch input panel; in response to detecting a slide gesture along the slider axis from the slider activation region to the first function output control region, generating a first function output control signal configured to initiate a first function at the electronic collar device; and in response to detecting the slide gesture extending along the slider axis from the first function output control region to the second function output control region, generating a second function output control signal configured to initiate a second function at the electronic collar device.

Another embodiment comprises a remote control for an electronic collar device for an animal. The remote control comprises a touch input panel, a transmitter, a processor, and a memory. The transmitter is configured to wirelessly communicate with an electronic collar device for an animal. The memory comprises a virtual slider multi-function control component executable by the processor. The virtual slider multi-function control component comprises logic configured to: define a slider axis on the touch input panel comprising a slider activation region, a first function output control region, and a second function output control region; in response to detecting a tap and hold gesture in the slider activation region of the touch input panel, initiate a virtual slider multi-function control operation configured to control the electronic collar device for an animal; enable the virtual slider multi-function control operation while the tap and hold gesture maintains continuous contact with the touch input panel; in response to detecting a slide gesture along the slider axis from the slider activation region to the first function output control region, generate a first function output control signal configured to initiate a first function at the electronic collar device; and in response to detecting the slide gesture extending along the slider axis from the first function output control region to the second function output control region, generate a second function output control signal configured to initiate a second function at the electronic collar device.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 12 is a data table illustrating an exemplary slider axis map for an embodiment of a multi-function, multi-intensity remote control unit.

FIG. 13 illustrates a user performing a tap-and-hold gesture in the slider activation region of the touch input panel to initiate an embodiment of a virtual slider multi-function control operation.

FIG. 14 illustrates the user performing a slide gesture from the slider activation region of FIG. 13 to the first lowest intensity sub-region in the first function region.

FIG. 15 illustrates the user performing a slide gesture from the first intensity sub-region of FIG. 14 to a second higher intensity sub-region in the first function region.

FIG. 16 illustrates the user performing a slide gesture from the second intensity sub-region of FIG. 15 to a third higher intensity sub-region in the first function region.

FIG. 17 illustrates the user performing a slide gesture from the third intensity sub-region of FIG. 16 to a fourth higher intensity sub-region in the first function region.

FIG. 18 illustrates the user performing a slide gesture from the fourth intensity sub-region of FIG. 17 to a fifth highest intensity sub-region in the first function region.

FIG. 19 illustrates the user performing a slide gesture from the fifth highest intensity sub-region in the first function region of FIG. 18 to a first lowest intensity sub-region in the second function region.

FIG. 20 illustrates the user performing a slide gesture from the first intensity sub-region in the second function region of FIG. 19 to a second higher intensity sub-region in the second function region.

FIG. 21 illustrates the user performing a slide gesture from the second intensity sub-region in the second function region of FIG. 20 to a third higher intensity sub-region in the second function region.

FIG. 22 illustrates the user performing a slide gesture from the third intensity sub-region in the second function region of FIG. 21 to a fourth higher intensity sub-region in the second function region.

FIG. 23 illustrates the user performing a slide gesture from the fourth intensity sub-region in the second function region of FIG. 22 to a fifth highest intensity sub-region in the second function region.

FIG. 24 illustrates the user performing a slide gesture from the fifth highest intensity sub-region in the second function region of FIG. 23 back to the fourth intensity sub-region in the second function region.

DETAILED DESCRIPTION

The word "exemplary" is used herein to mean "serving as an example, instance, or illustration." Any aspect described herein as "exemplary" is not necessarily to be construed as preferred or advantageous over other aspects.

Embodiments of the present invention provide a device for controlling the behavior of an animal.

The present invention includes a unique user interface control mechanism by which the user can conveniently control the behavior of an animal.

The present invention can be used to manage a pet or animal such as a dog. For purposes of explanation, and not by way of limitation, the present invention is described herein as a behavior control device for controlling the behavior of an animal.

Persons with ordinary skill in the art will recognize that various aspects of the present invention could also be used to control cats, other pets, farm animals, livestock, zoo animals, and so forth.

As FIGS. 1 to 7 show, the present invention provides a behavior control device 100 that comprises a remote unit 20.

Figure 1:
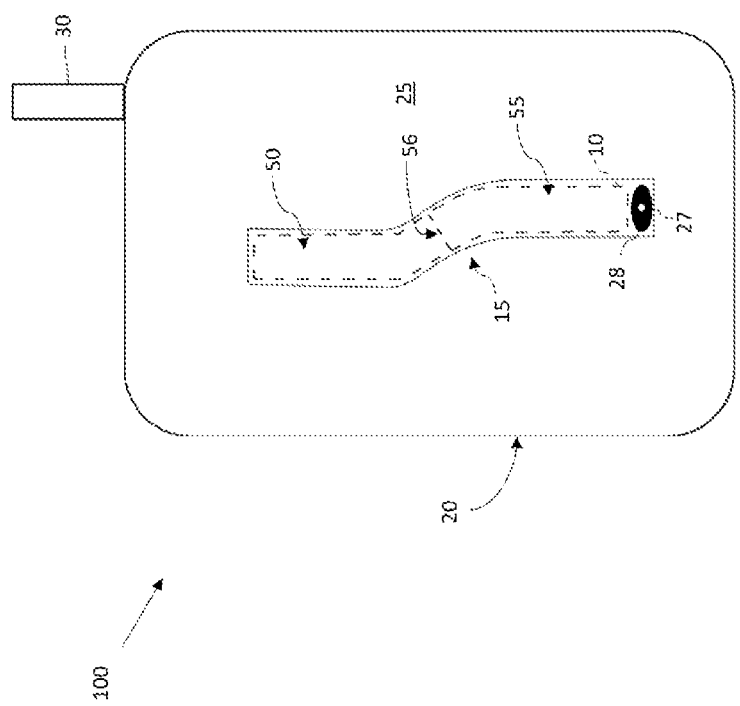
FIG. 1 is an illustration of one embodiment of the present invention.
Figure 2:
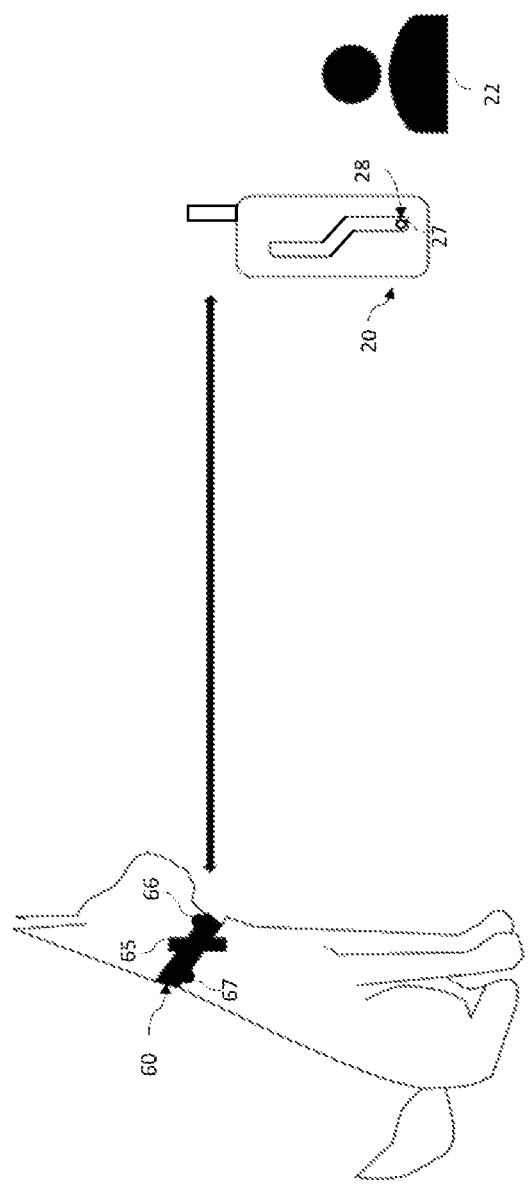
FIG. 2 is an illustration of one embodiment of the present invention in communication with an electronic collar device mounted on a dog.

As FIG. 2 shows, the remote unit 20 controlled by a user 22 can be configured to communicate with and for controlling an electronic collar device 60 that can be attached to a dog by a collar, harness, implant, or the like.

The electronic collar device 60 may include a receiver 65 for receiving control signals from the remote unit 20 for controlling at least one vibration device 66 or at least one shock device 67 attached to or contained within the electronic collar device 60.

Figure 3:
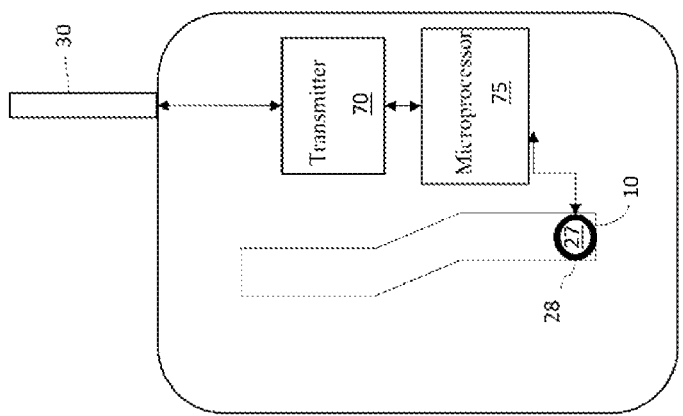
FIG. 3 is an illustration of an alternative embodiment of the present invention with a transmitter and a microprocessor.

As FIG. 3 shows, the remote unit 20 may include a transmitter 70 for transmitting the control signals to the receiver and a microprocessor 75 connected to the transmitter 70. The microprocessor 75 can be configured to cause the transmitter 70 to transmit the control signals to the receiver 65 for controlling the at least one device (e.g., the vibration device 66 or the shock device 67 or any other controllable device including a sound device) attached to or contained within the electronic collar device 60.

In one embodiment, the remote unit 20 may include a housing 25 and a sliding member 28, with the housing 25 including a curved channel 10 (e.g., a slider opening or a slot for the sliding member) to slide in.

Figure 4:
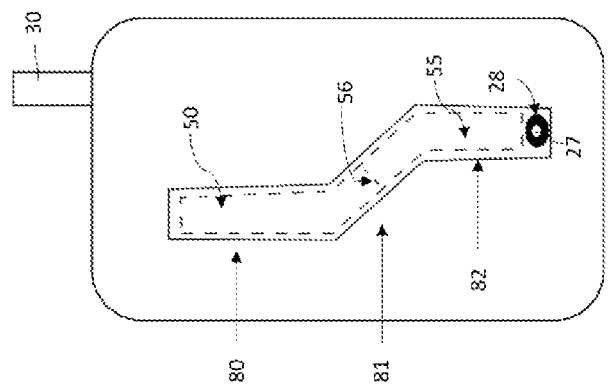
FIG. 4 is an illustration of one embodiment of the present invention showing a vibration section and a shock section.

The sliding member (slider) 28 is positioned in the curved channel (slider opening) 10, providing a path on the housing 25 for the sliding member 28 to slide along the path. The curved channel 10 can include three sections: a first portion 80, a second portion 81, and a third portion 82, as shown in FIG. 4. In some embodiment, the first portion 80 can include a shock section 50 and the third portion can include a vibration section 55. The vibration section 55 and the shock section 50 can meet in the second portion 81.

Figure 5:
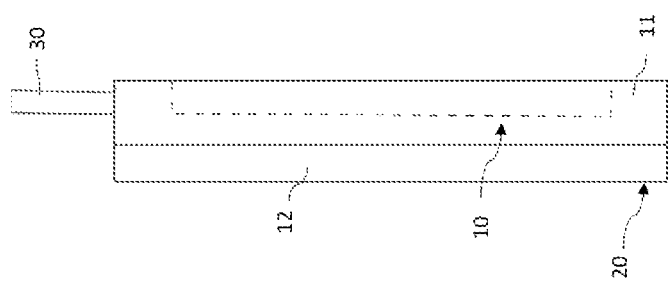
FIG. 5 is a sideview of one embodiment of the present invention showing a front housing member and a rear housing member.

In another embodiments, as FIG. 5 shows, the remote unit 20 can include a front housing member 11 and a rear housing member 12. The front housing member 11 can include a curved channel 10 formed along a front surface of the front housing member 11. The curved channel 10 may include a vibration section 55 and a shock section 50 which is continuously connected to the vibration section 55, as FIG. 4 shows.

In some embodiments, the curved channel 10 is curved at a point 56 where the vibration section 55 and the shock section 50 are connected.

The rear housing member 12 can be removably attached to the front housing member 11.

The remote unit 20 can include a sliding member 28 positioned in the curved channel 10. The sliding member 28 can be connected to the microprocessor 75 and the sliding member 28 can be configured to move along the curved channel 10 between the vibration section 55 and the shock section 50. When the sliding member 28 is positioned in the vibration section 55 or the shock section 50, the microprocessor 75 causes the transmitter 70 to transmit the control signals to the receiver 65. When the sliding member 28 is positioned in the vibration section 55, the control signals may include signals for controlling a vibration intensity of the at least one vibration device 66. When the sliding member 28 is positioned in the shock section 50, the control signals may include signals for controlling a shock intensity of the at least one shock device 67. For example, the remote unit 20 can be configured to increase the intensity of the vibration when the sliding member 28 moves upward from the bottom of the curved channel 10 and increase the shock intensity when the sliding member 28 moves upward from the bottom of the shock section 50 which can be the point 56 where the shock section 50 is connected to the vibration section 55.

In some embodiments, the remote unit 20 may include an antenna 30 connected to the transmitter 70. The antenna 30 can be any type of antenna suitable for communicating with the electronic collar device 60.

In some embodiments, as shown in FIG. 2, the remote unit 20 may communicate with the electronic collar device 60 using the RF transceiver or any other wireless technology known in the art to receive status information and to send commands to the electronic collar device 60.

In some embodiments, the curved channel 10 may include three straight elongated channels 80, 81, 82 connected together, as shown in FIG. 4, and a middle portion of the three straight elongated channels 80, 81, 82 includes a point 56 where the vibration section 55 and the shock section 50 are connected.

In some embodiments, the curved channel 10 can be positioned along the length of the housing 20, substantially in its central area, which can be rectangular, so that the sliding member 28 can be moved up and down on the curved channel 10.

In some embodiments, the vibration section 55 can be positioned on the bottom portion of the curved channel 10, the curved section in the middle portion of the curved channel 10, and the shock section 50 in the upper portion of the curved channel 10.

In some embodiments, the sliding member 28 can include a button 27 (e.g., a push button or any type of button known in the art) that can be pushed to allow the sliding member 28 to move, and when the button 27 is released, the button 27 can lock the sliding member's 28 position on the curved channel 10.

In some other embodiments, the vibration section 55 and shock section 50 can be marked to indicate levels of intensity. For example, the vibration section 55 can be marked on the housing 20 from 1 v to 5 v, moving upward from the bottom position of the curved channel 10.

The curved section 15 of the curved channel 10 can be positioned in the middle of the curved channel 10 connecting the vibration section 55 and the shock section 50. This curved section 15 can be curved to require the user to exert extra effort before moving the sliding member 28 to the shock section 50 from the vibration section 55, thus avoiding accidentally sending a shock to the dog.

Figure 6:
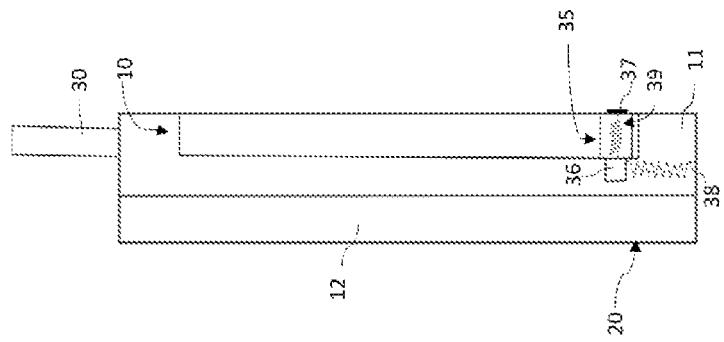
FIG. 6 is an illustration of a cross section of one embodiment of the present invention showing a spring-loaded slider.

In some embodiments, as shown in FIG. 6, the sliding member 28 may include a spring-loaded slider 35 (attached to a slider spring 38) and a latch 36 (attached to a latch spring 39) that includes a latch button 37 positioned on the spring-loaded slider 35, the latch button 37 is configured to lock and release the latch 36 to allow the spring-loaded slider 35 to move along the curved channel 10. In such embodiments, the spring-loaded slider 35 can spring back to its original place once the latch button 37 on the slider is released.

The remote unit 20 of the present invention may be configured to send sound, vibration, and shock to the electronic collar device 60 and the remote unit 20 may be able to increase the intensity of vibration and shock using the sliding member 28. For example, the remote unit 20 may be configured so that once the button 27 is pressed, the remote unit 20 makes the electronic collar device 60 beep and frees the sliding member 28 to move around.

Figure 7:
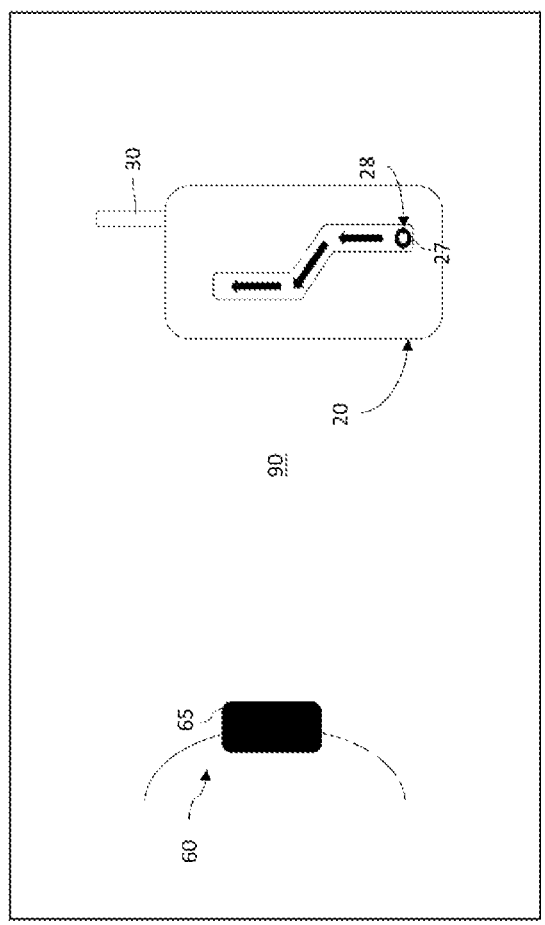
FIG. 7 is an illustration showing one embodiment of the present invention and the electronic collar device placed on a wireless charging pad.

In some aspects, as shown in FIG. 7, the remote unit 20 may be loaded with wireless charging technology, allowing it to be charged when placed on a wireless charging pad 90, which can be any suitable charging pad known in the art.

In some other aspects, the electronic collar device 60 communicating with the remote unit 20 can also be configured to be wirelessly charged by a wireless charging pad 90.

Many available dog shock collars have remotes, but none uses a slider design—they all reserve a dedicated button for each function.

Traditionally, remotes have used three different buttons to activate sound, vibration, and shock, in combination with two more buttons to increase and decrease the intensity of vibrations and shocks. The present invention uses a single slider (sliding member 28) to control all these functions. When the user pushes the button 27 on the slider (sliding member 28), it beeps and frees the slider (sliding member 28) to move up or down.

In use, when a dog misbehaves, the user 22 can push the button 27 so that the present invention makes the dog's electronic collar device 60 beep. If the dog does not stop misbehaving, the user 22 can push the sliding member 28 upward to make the electronic collar device 60 vibrate. If the dog still does not stop misbehaving, the user 22 can push the sliding member 28 still farther upward to increase the intensity of the vibration. If the dog still does not respond, the user 22 can push the sliding member 28 farther still to administer a shock and may continue moving the sliding member 28 upward to increase the shock intensity until the dog stops. When the user 22 releases the sliding member 28, it quickly springs back into its original position at the bottom of the curved channel 10. All activities are stopped once the button 27 (or a latch button 37) on the sliding member 28 is released.

As described above in connection with the embodiments illustrated in FIGS. 1-7, the remote control device provides a unique, convenient and efficient mechanism for controlling multiple functions (e.g., vibration, shock, sound, etc., and combinations thereof) associated with the electronic collar device, as well as multiple intensity levels for each function, using a single, integrated sliding user interface control (e.g., sliding member 28, spring-loaded slider 35, etc.) in contrast to existing solutions which require multiple buttons or user interface mechanisms to control each separate function and any applicable intensity level(s) for each function. With reference to FIGS. 8-25, various additional embodiments are disclosed for providing the integrated, multi-function and/or multi-intensity slider mechanism via a touch input panel. One of ordinary skill in the art will appreciate that the touch input panel may be implemented using any suitable touch-based, haptic, or gesture-based technology, including, for example, resistive touch, optical imaging touch, capacitive touch, infrared touch, or other technology. Furthermore, the touch input panel may comprise a standalone touch input device without an accompanying output display or, in other embodiments, may employ a touchscreen display that supports both touch and gesture inputs and a graphical user interface display for outputs. In this regard, in other embodiments, the integrated, multi-function slider mechanism described in connection with FIGS. 8-25, may be implemented via any computer program(s), including, for example, a native application or web application executed on any portable communication device or portable computing device (e.g., cellular telephones, smart phones, tablet computers, portable game consoles, wearable devices or watches, or other battery-powered computing devices).

Figure 8:
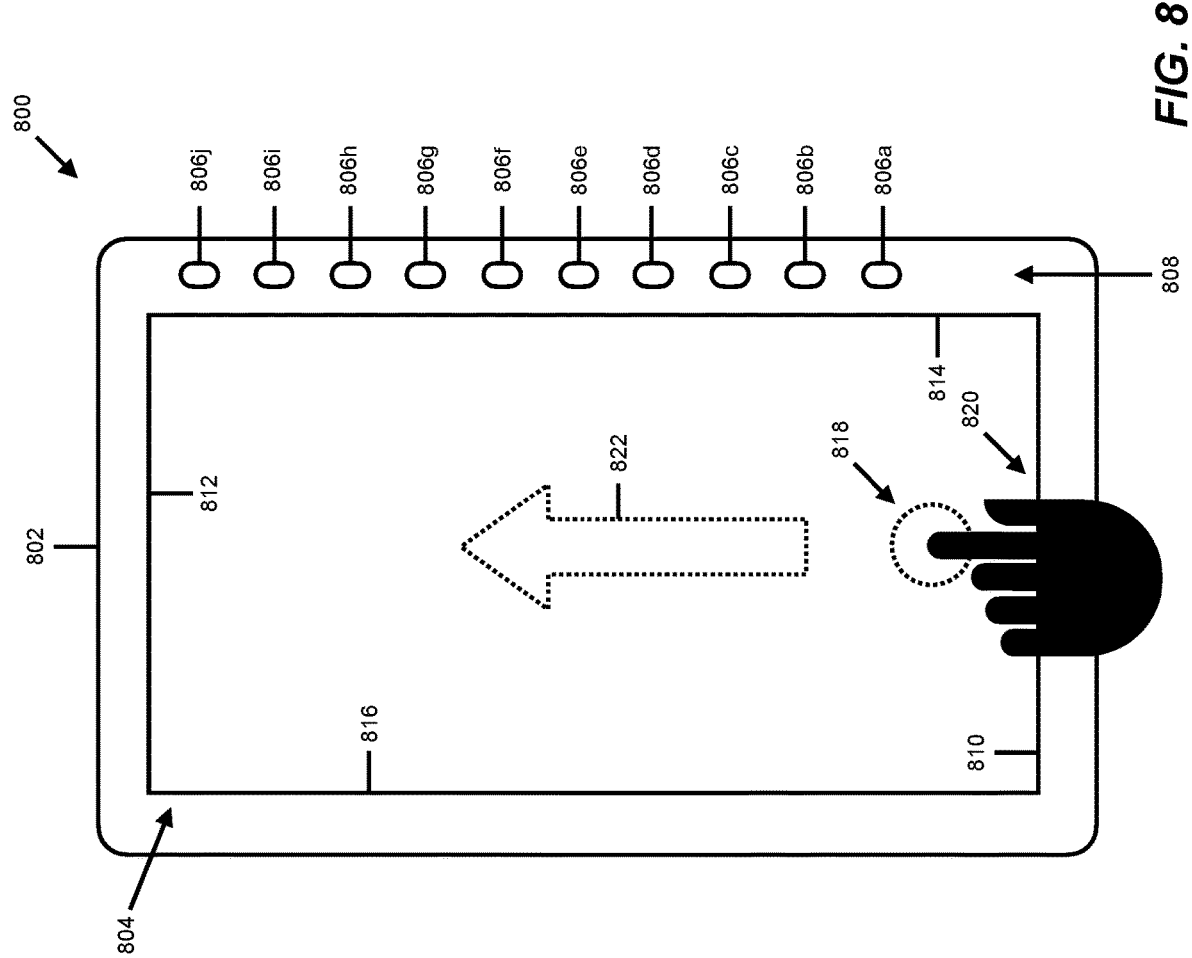
FIG. 8 is a front view of an embodiment of a remote control device comprising a touch input panel for implementing an embodiment of an integrated multi-function virtual slider for remotely controlling an electronic collar device.
Figure 10:
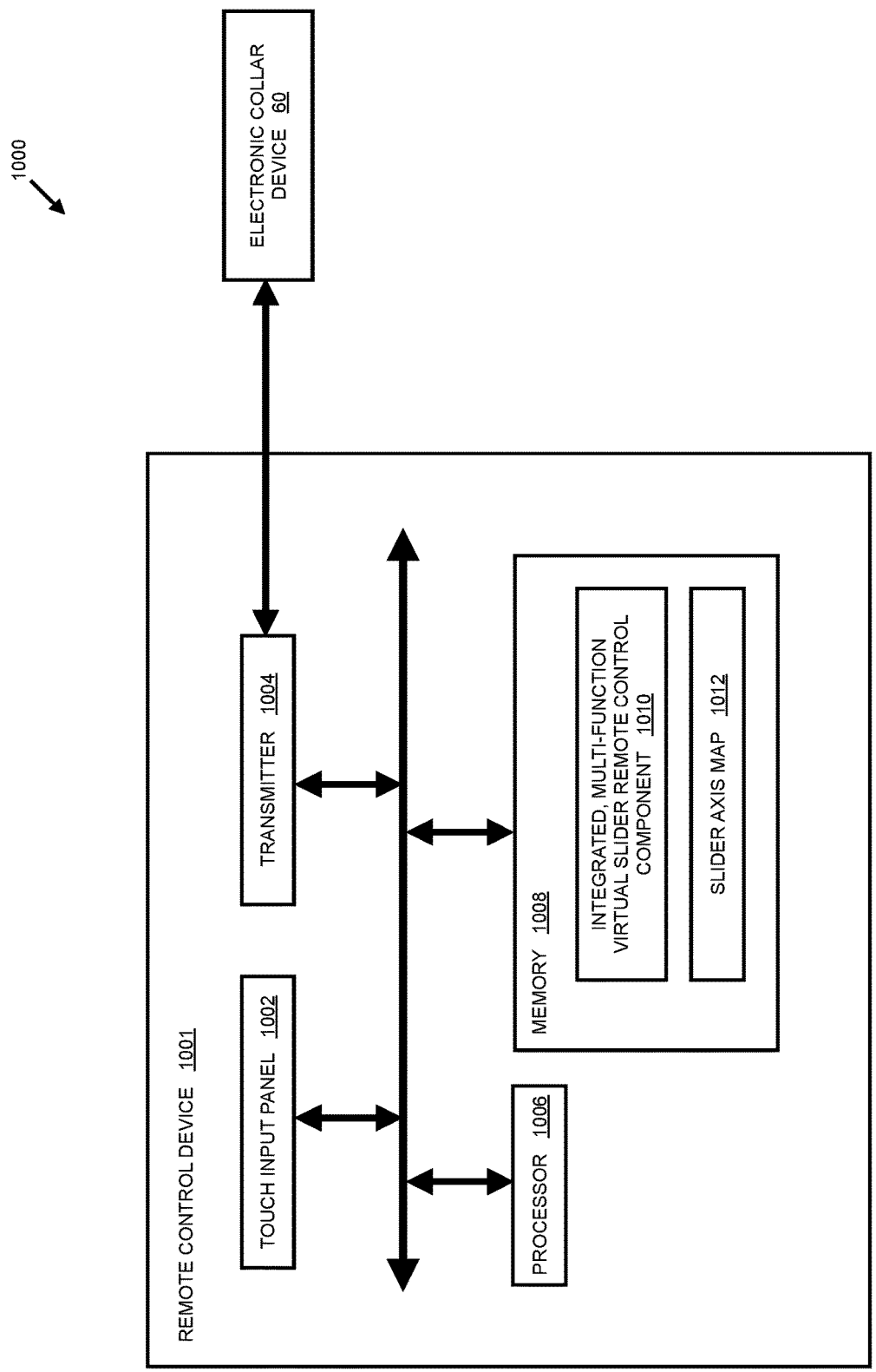
FIG. 10 is a block diagram illustrating an embodiment of a remote control device for implementing an integrated multi-function virtual slider.

As illustrated in FIG. 8, an embodiment of a remote control device 800 may comprise a touch input panel 804 disposed in a housing 802 with other operative components (e.g., transmitter 1004, processor 1006, and memory 1008) for implementing an integrated multi-function virtual slide remote control component 1010, as illustrated in FIG. 10. FIG. 8 generally illustrates that the touch input panel 804 comprises a touch surface having a top edge 812, a bottom edge 810, and opposing sides 814 and 816. As described below in more detail, the integrated multi-function virtual slider remote control component 1010 enables a user 820 to activate or initiate a virtual slider multi-function control operation by performing, for example, a tap and hold gesture 818, and then continuously cycle through multiple functions and/or multiple function-specific intensity levels by subsequently performing a slide gesture along a virtual slider axis 822 in either direction. One of ordinary skill in the art will appreciate that the tap and hold gesture 818 may comprise any suitable touch input gesture(s) (e.g., one or more taps, an edge swipe gesture from one of edges 810, 812, 814 or 816, etc.) performed at a predefined location on the touch input panel 804 followed by a "hold" gesture by which contact or close position is subsequently maintained with the touch input panel 804 to maintain activation of the virtual slider multi-function control operation. In this regard, upon initiating the virtual slider multi-function control operation via the tap and hold gesture 818, the virtual slider will be active until the hold gesture is released by, for example, removing touch contact with the touch input panel 804. Once the hold gesture is released, the virtual slider multi-function control operation is deactivated and control of the electronic collar device 60 is disabled until another tap and hold gesture is performed to re-initiate the virtual slider. In this manner, certain embodiments of the virtual slider multi-function control operation may simulate the spring-loaded manual operation described above in which the sliding member 28 is returned to a default non-operative position upon release of the physical member.

As further illustrated in FIG. 8, the remote control device 800 may further comprise visual indicators to selectively indicate to the user 820 various modes of operation, such as, a current function and/or intensity level. In the embodiment of FIG. 8, one or more visual indicators (e.g., light-emitting diodes 806, icons, etc.) may be disposed on a side panel 808 adjacent and operatively linked to slider axis 822. It should be appreciated that the visual indicators may be integrated with the touch input panel 804 in embodiments where implemented via a touchscreen display. The remote control device 800 may further incorporate audio or sound alerts to indicate various modes of operation via a sound output device (e.g., a speaker, a sound transducer, piezoelectric, or any electroacoustic transducer capable of producing an audible sound). For example, in an embodiment, the remote control device 800 may trigger an audio or sound notification at the remote control device 800 and/or the electronic collar device 60 in response to, for example, the initiation of the virtual slide multi-function operation (block 1106—FIG. 11) or slider movement between user interface regions and/or sub-regions (decision block 1112—FIG. 11 and FIGS. 13-25), as described below in more detail. In this regard, the audio or sound notifications may comprise different tones, frequencies, and/or volume levels to audibly identify different functions and/or intensity levels to the user.

Figure 9:
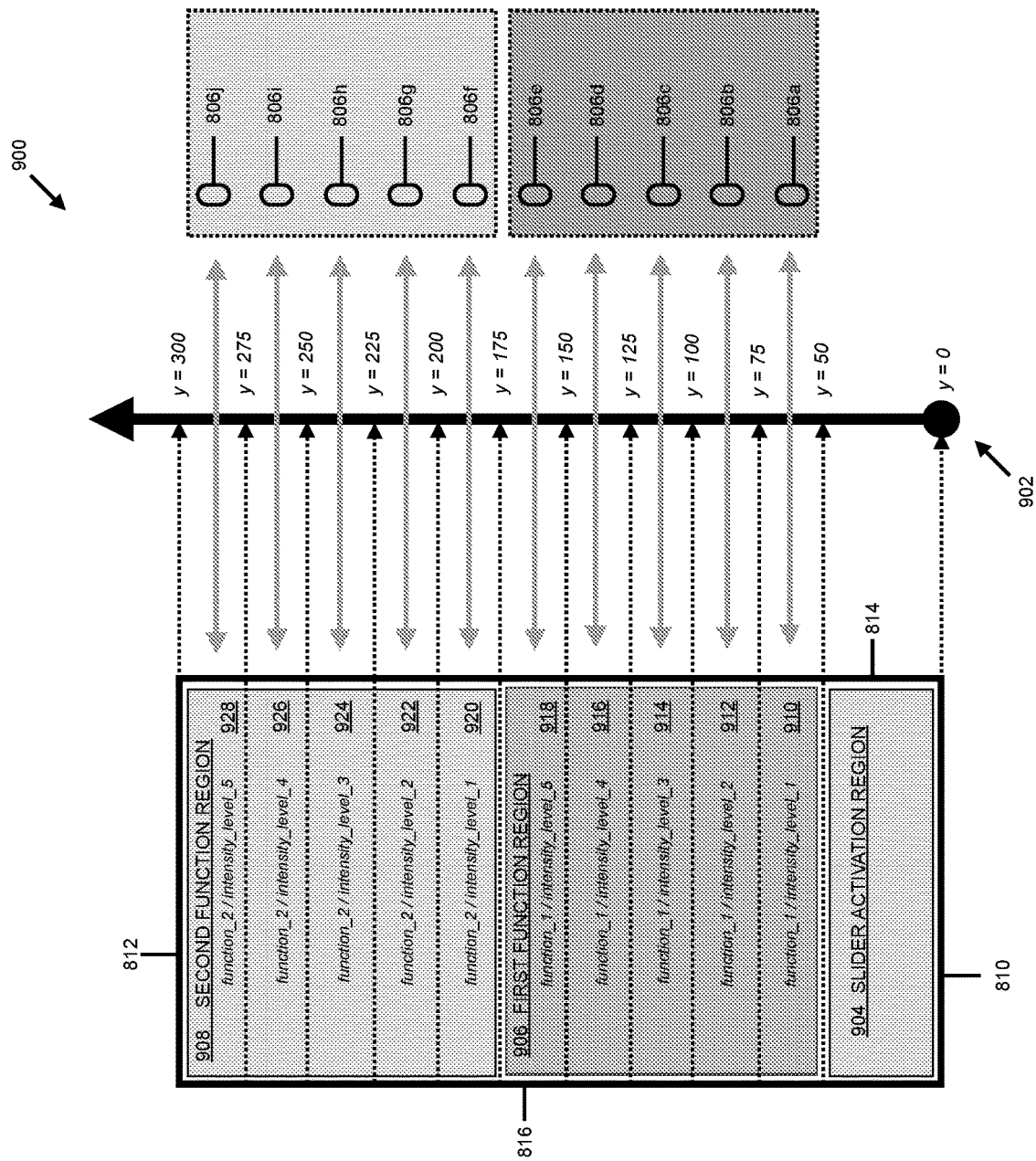
FIG. 9 is a combined block and data diagram illustrating an exemplary slider axis map for an embodiment of an integrated multi-function virtual slider comprising two function-specific user interface regions and a slider activation region.

FIG. 9 illustrates an embodiment in which the remote control device 800 supports two separate functions (e.g., a first "vibration" function and a second "shock" function) with five accompanying function-specific intensity levels associated with the electronic collar device 60. In this embodiment, the virtual slider axis 902 specifies locations along a y-axis of the touch input panel 804 that define user interface regions for controlling the virtual slider operation. As illustrated in FIG. 9, the virtual slider axis 902 may define (e.g., in a slider axis map 1012 stored in a memory 1008—FIG. 10) a slider activation region 904, a first function output control region 906, and a second function output control region 908 in logical association with predefined y-axis slider values. In the exemplary embodiment of FIGS. 9 and 12, the y-axis slider values comprise values in the range from [1-300]. It should be appreciated, however, that any suitable range, values, size and/or number of sub-regions, etc. may be implemented depending on, for example, the dimensions of the touch input panel 804 and to accommodate various embodiments of gestures. The slider activation region 904 is disposed at a lower edge 810 of the touch input panel 804 and is logically associated with y-axis slider values [1-50]. The first function output control region 906 is disposed adjacent the slider activation region 904 and is logically associated with y-axis slider values [51-175].

The first function output control region 906 may further comprise sub-regions associated with function-specific intensity levels (i.e., increasing intensity levels along the virtual slider axis 902. A first function intensity sub-region 910 is disposed adjacent the slider activation region 904 and is logically associated with y-axis slider values [51-75] to control a first "lowest" intensity level for the first function. A first function intensity sub-region 912 is disposed adjacent sub-region 910 and is logically associated with y-axis slider values [76-100] to control a second intensity level for the first function. A first function intensity sub-region 914 is disposed adjacent sub-region 912 and is logically associated with y-axis slider values [101-125] to control a third intensity level for the first function. A first function intensity sub-region 916 is disposed adjacent sub-region 914 and is logically associated with y-axis slider values [126-150] to control a fourth intensity level for the first function. A first function intensity sub-region 918 is disposed adjacent sub-region 916 and is logically associated with y-axis slider values [151-175] to control a fifth "highest" intensity level for the first function.

As further illustrated in FIG. 9, the second function output control region 908 is disposed adjacent the first function output control region 906 and is logically associated with y-axis slider values 176-300]. The second function output control region 908 may further comprise sub-regions for controlling the associated second function intensity levels. A second function intensity sub-region 920 is disposed adjacent the first function intensity sub-region 918 and is logically associated with y-axis slider values [176-200] to control a first "lowest" intensity level for the second function. A second function intensity sub-region 922 is disposed adjacent the second function intensity sub-region 920 and is logically associated with y-axis slider values [201-225] to control a second intensity level for the second function. A second function intensity sub-region 924 is disposed adjacent the second function intensity sub-region 922 and is logically associated with y-axis slider values [226-250] to control a third intensity level for the second function. A second function intensity sub-region 926 is disposed adjacent the second function intensity sub-region 924 and is logically associated with y-axis slider values [251-275] to control a fourth intensity level for the second function. A second function intensity sub-region 928 is disposed adjacent the second function intensity sub-region 926 and is logically associated with y-axis slider values [276-300] to control a fifth "highest" intensity level for the second function.

As further illustrated in FIG. 9, the visual indicators 806 may be aligned with the corresponding touch input panel sub-regions relative to the virtual slider axis 902 to indicate the current function and intensity level during the virtual slider multi-function control operation. In this regard, visual indicators 806a, 806b, 806c, 806d, 806e, 806f, 806g, 806h, 806i, and 806j are aligned and correspond to sub-regions 910, 912, 914, 916, 918, 920, 922, 924, 926, and 928, respectively.

FIG. 12 illustrates an embodiment of a data structure 1200 for logically defining and operatively maintaining and controlling the virtual slider multi-function control operation based on detection of the tap and hold gesture 818 in the slider activation region 904 and the location of subsequent slide gestures in accordance with the y-axis slider values. The exemplary data structure 1200 stores the above-described y-axis slider value ranges (column 1202) in logical association with the corresponding generated output signals (column 1204) to be communicated to the electronic collar device 60.

FIG. 10 illustrates another embodiment of a remote control device 1001 for implementing an integrated multi-function virtual slider. As described above in connection with FIGS. 1-7 and illustrated in FIG. 10, the remote control device 1001 operates as a component of an overall system 1000 for controlling operation of an electronic dog collar 60. Remote control device 1001 comprises a touch input panel 1002, a transmitter 1004, a processor 1006, and a memory 1008 operatively connected via a local interface. Memory 1008 may store an integrated multi-function virtual slider remote control component 1010 and a slider axis map 1012, which may be accessed and executed by processor 1006 to implement the virtual slider multi-function control operation. It should be appreciated that transmitter 1004 receives output signals (column 1204—FIG. 12) generated by the integrated multi-function virtual slider remote control component 1010, and transmits them to electronic collar device 60. Transmitter 1004 may comprise a one-way transmitter or, in other embodiments, may comprises a transceiver configured to support two-way communication with electronic collar device.

Figure 11:
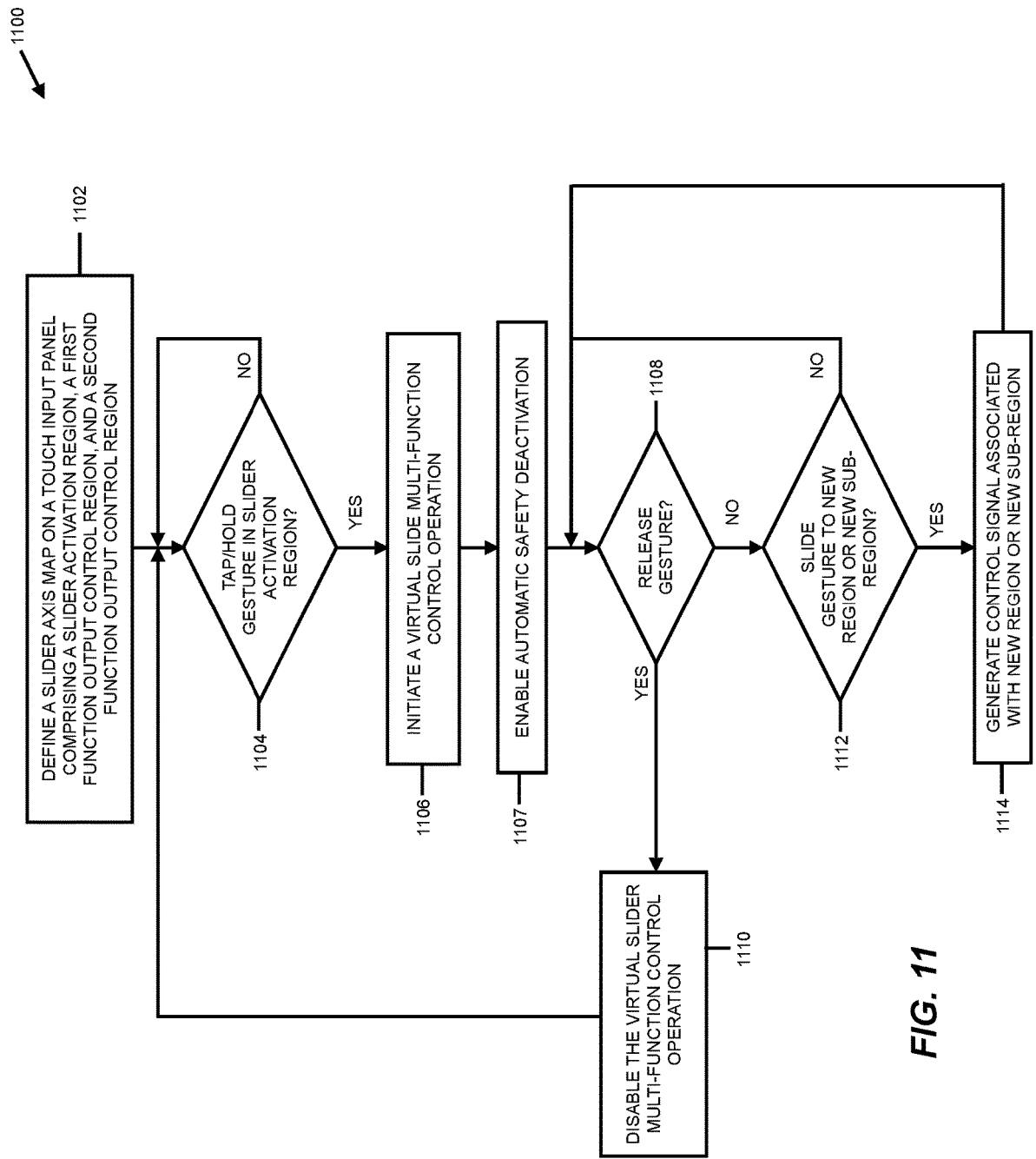
FIG. 11 is a flowchart illustrating an embodiment of a method for implementing an integrated multi-function virtual slider.

FIG. 11 is a flowchart illustrating an embodiment of a method 1100 for implementing the integrated multi-function virtual slider remote control component 1010. It should be appreciated that one or more of the process or method descriptions associated with method 1100 or any block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory (e.g., memory 1008—FIG. 10) or non-volatile memory and that is executed by hardware or any other processor(s) or suitable instruction execution system associated with the remote control device (e.g., processor 1006—FIG. 10). Furthermore, the logical functions may be embodied in any non-transitory computer readable medium for use by or in connection with an instruction execution system, apparatus, or device, such as a computer-based system, processor-containing system, or other system associated with the remote control unit that can fetch the instructions from the instruction execution system, apparatus, memory, or device and execute the instructions.

As illustrated in FIG. 11, at block 1102, a virtual slider axis (e.g., slider axis 902—FIG. 9) corresponding to the touch panel input 804 may be defined, configured, and stored in memory 1008 (e.g., with accompanying data structure 1200—FIG. 12). The virtual slider axis logically defines the locations on the touch panel input 804 corresponding to the slider activation region 904, the first function output control region 906, and the second function output control region 908. At decision block 1104, the integrated multi-function virtual slider remote control component 1010 detects a tap and hold gesture performed in the slider activation region 904. In response to detecting the tap and hold gesture in the slider activation region 904, at block 1106, the virtual slider multi-function control operation is initiated, activated, or enabled. At block 1107, an automatic safety deactivation feature may be enabled, whereby the virtual slider multi-function control operation may be automatically disabled upon occurrence of certain conditions (e.g., absolute timeout value, tap/hold timeout, time value within a region and/or sub-region without slider movement, etc.). As illustrated at decision block 1108, if the hold gesture is released, the virtual slider multi-function control operation is disabled (block 1110), and the method returns to decision block 1104 to detect whether the virtual slider multi-function control operation is to be re-initiated. While the tap and hold gesture is maintained (i.e., not released), the virtual slider multi-function control operation monitors the touch input panel 804 for continuous movement of the slide gesture relative to the virtual slider axis. As illustrated at decision block 1112, when the slider gesture is extended from the slider activation region 904 to the first function output control region 906, the appropriate control signal is generated (block 1114) and provided to the transmitter 1004. Flow returns to decision block 1108 to detect release of the tap and hold gesture and, if not released, the virtual slider multi-function control operation resumes monitoring the touch input panel 804 for further movement of the slide gesture into new sub-regions or the second function output control region 908, as the case may be, upon which the appropriate new control signal is generated (block 1114) and transmitted to the transmitter 1004.

To further illustrate the virtual slider multi-function control operation, FIGS. 13-25 show an exemplary sequence of user interactions with the touch input panel 804. In FIG. 13, the user 820 is performing a tap and hold gesture 1302 in the slider activation region 904 of the touch input panel 804 to initiate an embodiment of a virtual slider multi-function control operation. While maintaining the tap and hold gesture 1302, in FIG. 14, the user 820 performs a slide gesture from the slider activation region 904 to a new location 1402 associated with the first lowest intensity sub-region 910 in the first function output control region 906. In response, an output control signal is generated and transmitted to the electronic collar device 60 for executing the first function at the first intensity level. As further illustrated in FIG. 14, visual indicator 806a may be enabled to indicate this mode of operation.

While continuing to maintain the tap and hold gesture 1302, in FIG. 15, the user 820 performs a slide gesture from the first lowest intensity sub-region 910 in the first function output control region 906 to a new location 1502 in the second intensity sub-region 912. In response, an output control signal is generated and transmitted to the electronic collar device 60 for executing the first function at the second intensity level. As further illustrated in FIG. 15, visual indicator 806*b* may be enabled to indicate this mode of operation.

While continuing to maintain the tap and hold gesture 1302, in FIG. 16, the user 820 performs a slide gesture from the second intensity sub-region 912 in the first function output control region 906 to a new location 1602 in the third intensity sub-region 914. In response, an output control signal is generated and transmitted to the electronic collar device 60 for executing the first function at the third intensity level. As further illustrated in FIG. 16, visual indicator 806*c* may be enabled to indicate this mode of operation.

While continuing to maintain the tap and hold gesture 1302, in FIG. 17, the user 820 performs a slide gesture from the third intensity sub-region 914 in the first function output control region 906 to a new location 1702 in the fourth intensity sub-region 916. In response, an output control signal is generated and transmitted to the electronic collar device 60 for executing the first function at the fourth intensity level. As further illustrated in FIG. 17, visual indicator 806*e* may be enabled to indicate this mode of operation.

While continuing to maintain the tap and hold gesture 1302, in FIG. 18, the user 820 performs a slide gesture from the fourth intensity sub-region 916 in the first function output control region 906 to a new location 1802 in the fifth "highest" intensity sub-region 918. In response, an output control signal is generated and transmitted to the electronic collar device 60 for executing the first function at the fifth "highest" intensity level. As further illustrated in FIG. 18, visual indicator 806*e* may be enabled to indicate this mode of operation.

While continuing to maintain the tap and hold gesture 1302, in FIG. 19, the user 820 performs a slide gesture from the fifth intensity sub-region 918 in the first function output control region 906 to a new location 1902 in the first "lowest" intensity sub-region 920 in the second function output control region 908. In response, an output control signal is generated to switch the electronic collar device 60 from the first function to the second function at the first "lowest" intensity level. As further illustrated in FIG. 19, visual indicator 806*f* may be enabled to indicate this mode of operation.

While continuing to maintain the tap and hold gesture 1302, in FIG. 20, the user 820 performs a slide gesture from the first intensity sub-region 920 in the second function output control region 908 to a new location 2002 in the second intensity sub-region 922. In response, an output control signal is generated and transmitted to the electronic collar device 60 for executing the second function at the second intensity level. As further illustrated in FIG. 20, visual indicator 806*g* may be enabled to indicate this mode of operation.

While continuing to maintain the tap and hold gesture 1302, in FIG. 21, the user 820 performs a slide gesture from the second intensity sub-region 922 in the second function output control region 908 to a new location 2102 in the third intensity sub-region 924. In response, an output control signal is generated and transmitted to the electronic collar device 60 for executing the second function at the third intensity level. As further illustrated in FIG. 21, visual indicator 806*h* may be enabled to indicate this mode of operation.

While continuing to maintain the tap and hold gesture 1302, in FIG. 22, the user 820 performs a slide gesture from the third intensity sub-region 924 in the second function output control region 908 to a new location 2202 in the fourth intensity sub-region 926. In response, an output control signal is generated and transmitted to the electronic collar device 60 for executing the second function at the fourth intensity level. As further illustrated in FIG. 22, visual indicator 806*i* may be enabled to indicate this mode of operation.

While continuing to maintain the tap and hold gesture 1302, in FIG. 23, the user 820 performs a slide gesture from the fourth intensity sub-region 924 in the second function output control region 908 to a new location 2302 in the fifth "highest" intensity sub-region 928. In response, an output control signal is generated and transmitted to the electronic collar device 60 for executing the second function at the fifth "highest" intensity level. As further illustrated in FIG. 23, visual indicator 806*j* may be enabled to indicate this mode of operation.

To illustrate the bi-directional control along the virtual slider access, in FIG. 24, while continuing to maintain the tap and hold gesture 1302, the user 820 performs a slide gesture from the fifth intensity sub-region 928 back in the second function output control region 908 back to a new location 2402 in the fourth intensity sub-region 926. In response, an output control signal is generated and transmitted to the electronic collar device 60 for executing the second function at the fourth intensity level. As further illustrated in FIG. 24, visual indicator 806*j* may be disabled to indicate this mode of operation.

Figure 25:
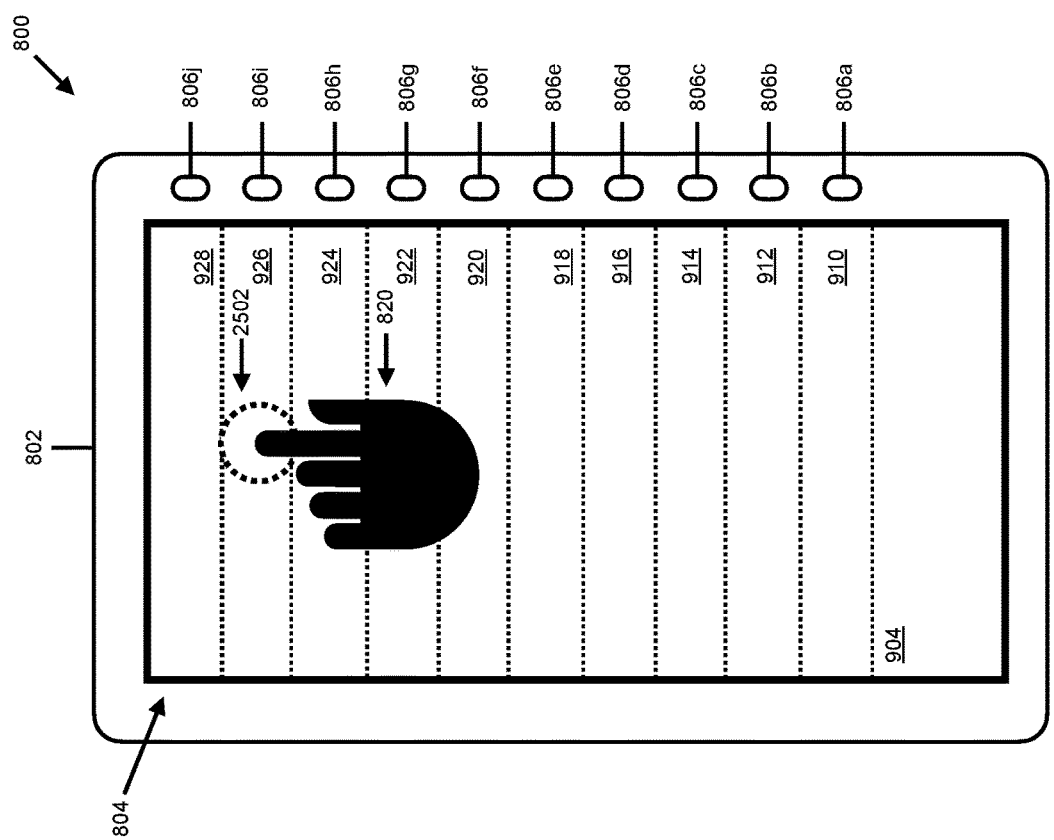
FIG. 25 illustrates the user performing a release gesture to disable the virtual slider multi-function control operation.

FIG. 25 illustrates the user 820 performing a release gesture 2502. In response to the release gesture 2502, the virtual slider multi-function control operation is disabled, and this mode is reflected by disabling all visual indicators 806.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A computer program embodied in a non-transitory computer readable medium and executable by a processor for providing a multi-function remote control for an electronic collar device for an animal, the computer program comprising logic configured to:
   define a slider axis on a remote control touch input panel comprising a slider activation region, a first function output control region, and a second function output control region, the second function output control region comprising a plurality of second function intensity level sub-regions;
   in response to detecting a tap and hold gesture in the slider activation region of the remote control touch input panel, initiating a virtual slider multi-function control operation configured to control an electronic collar device for an animal;
   enabling the virtual slider multi-function control operation while the tap and hold gesture maintains continuous contact with the remote control touch input panel and disabling the virtual slider multi-function control operation in response to detecting a release gesture after the tap and hold gesture;

during the enabled virtual slider multi-function control operation, in response to detecting a slide gesture along the slider axis from the slider activation region to the first function output control region, generating a first function output control signal configured to initiate a first function at the electronic collar device, the first function output control signal comprising one of a vibration signal and a sound signal;

in response to detecting the slide gesture extending along the slider axis from the first function output control region to the second function output control region, generating a second function output control signal configured to initiate a second function at the electronic collar device, the second function output control signal comprising a shock signal; and in response to detecting the slide gesture along the slider axis in the second function output control region from one of the second function intensity level sub-regions to another of the second function intensity level sub-regions, modifying the second function output control signal to increase an intensity level of the second function.

2. The computer program of claim 1, wherein the tap and hold gesture comprises an edge gesture associated with the slider activation region.

3. The computer program of claim 1, wherein the remote control touch input panel comprises a touchscreen display on a mobile communication device.

4. The computer program of claim 1, wherein the first function output control region comprises a plurality of first function intensity level sub-regions.

5. The computer program of claim 4, further comprising logic configured to:

in response to detecting the slide gesture along the slider axis in the first function output control region from one of the first function intensity level sub-regions to another of the first function intensity level sub-regions, modifying the generated first function output control signal to increase an intensity level of the first function.

6. A remote control for an electronic collar device for an animal, the remote control comprising:

a touch input panel;

a transmitter configured to wirelessly communicate with an electronic collar device for an animal;

a processor; and a memory comprising a virtual slider multi-function control component executable by the processor, the virtual slider multi-function control component comprising logic configured to:

define a slider axis on the touch input panel comprising a slider activation region, a first function output control region, and a second function output control region, the second function output control region comprising a plurality of second function intensity level sub-regions;

in response to detecting a tap and hold gesture in the slider activation region of the touch input panel, initiate a virtual slider multi-function control operation configured to control the electronic collar device for an animal;

enable the virtual slider multi-function control operation while the tap and hold gesture maintains continuous contact with the touch input panel and disable the virtual slider multi-function control operation in response to detecting a release gesture after the tap and hold gesture;

during the enabled virtual slider multi-function control operation, in response to detecting a slide gesture along the slider axis from the slider activation region to the first function output control region, generate a first function output control signal configured to initiate a first function at the electronic collar device, the first function output control signal comprising one of a sound signal and a vibration signal;

in response to detecting the slide gesture extending along the slider axis from the first function output control region to the second function output control region, generate a second function output control signal configured to initiate a second function at the electronic collar device, the second function output control signal comprising a shock signal; and in response to detecting the slide gesture along the slider axis in the second function output control region from one of the second function intensity level sub-regions to another of the second function intensity level sub-regions, modifying the second function output control signal to increase an intensity level of the second function.

7. The remote control of claim 6, further comprising a sound output device configured to provide a first sound alert when the first function output control signal is generated and a second sound alert when the second function output control signal is generated.

8. The remote control of claim 6, wherein the first function output control region comprises a plurality of first function intensity level sub-regions.

9. The remote control of claim 8, further comprising logic configured to:

in response to detecting the slide gesture along the slider axis in the first function output control region from one of the first function intensity level sub-regions to another of the first function intensity level sub-regions, modifying the generated first function output control signal to increase an intensity level of the first function.

10. The remote control of claim 9, wherein the touch input panel comprises a touchscreen display configured to display a current function and a current intensity level associated with the virtual slider multi-function control operation.

11. A method for providing a multi-function remote control for an electronic collar device for an animal, the computer program comprising logic configured to:

configuring a remote control touch input panel with a slider activation region, a first function output control region, and a second function output control region according to a stored virtual slider axis, the second function output control region comprising a plurality of second function intensity level sub-regions;

in response to detecting a tap and hold gesture in the slider activation region of the remote control touch input panel, initiating a virtual slider multi-function control operation configured to control an electronic collar device for an animal;

enabling the virtual slider multi-function control operation while the tap and hold gesture maintains continuous contact with the remote control touch input panel and disabling the virtual slider multi-function control operation in response to detecting a release gesture after the tap and hold gesture;

during the enabled virtual slider multi-function control operation, in response to detecting a slide gesture based on the stored virtual slider axis from the slider activation region to the first function output control region, generating a first function output control signal configured to initiate a first function at the electronic collar device, the first function output control signal comprising one of a vibration signal and a sound signal;

in response to detecting the slide gesture extending along the stored virtual slider axis from the first function output control region to the second function output control region, generating a second function output control signal configured to initiate a second function at the electronic collar device, the second function output control signal comprising a shock signal; and in response to detecting the slide gesture along the stored virtual slider axis in the second function output control region from one of the second function intensity level sub-regions to another of the second function intensity level sub-regions, modifying the second function output control signal to increase an intensity level of the second function.

12. The method of claim 11, wherein the tap and hold gesture comprises an edge gesture associated with the slider activation region.

13. The method of claim 11, wherein the first function output control region comprises a plurality of first function intensity level sub-regions.

14. The method of claim 13, further comprising:
in response to detecting the slide gesture along the stored virtual slider axis in the first function output control region from one of the first function intensity level sub-regions to another of the first function intensity level sub-regions, modifying the generated first function output control signal to increase an intensity level of the first function.

* * * * *